United States Patent
Simms et al.

[11] Patent Number: 6,161,155
[45] Date of Patent: Dec. 12, 2000

[54] APPARATUS AND METHOD FOR STORING RETRIEVABLE BOUNDARY INFORMATION INTO A BUFFER MEMORY OF A RECEIVING DEVICE

[75] Inventors: Mark J. Simms, Boise; R. Alexis Takasugi, Eagle, both of Id.

[73] Assignee: Hewlett-Packard Company, Palo Alto, Calif.

[21] Appl. No.: 09/119,170

[22] Filed: Jul. 20, 1998

[51] Int. Cl.[7] .............................. G06F 13/00; G06F 3/00
[52] U.S. Cl. ............................... 710/57; 710/52; 710/56; 711/173; 711/200
[58] Field of Search ................................. 710/52, 56, 57; 711/173, 200

[56] References Cited

U.S. PATENT DOCUMENTS

| | | | |
|---|---|---|---|
| 4,241,420 | 12/1980 | Fish et al. | 711/112 |
| 4,843,544 | 6/1989 | DuLac et al. | 710/53 |
| 5,563,920 | 10/1996 | Fimoff et al. | 375/354 |
| 5,583,894 | 12/1996 | Linsley | 375/372 |
| 5,805,930 | 9/1998 | Rosenthal et al. | 710/57 |
| 5,873,121 | 2/1999 | Merchant et al. | 711/173 |

FOREIGN PATENT DOCUMENTS 0090137  5/1983  European Pat. Off.

*Primary Examiner*—Thomas C. Lee
*Assistant Examiner*—Tammara Peyton
*Attorney, Agent, or Firm*—Matthew L. Wade

[57] ABSTRACT

Apparatus and method for storing retrievable boundary information into a buffer memory of a receiving device. In one arrangement, the boundary information is used to indicate where a block of data ends in the buffer memory. In another arrangement, the boundary information is used to indicate where a burst begins and ends in the buffer memory. This is accomplished by the use of boundary indicators and following a set of organization rules as data and boundary indicators are written into the buffer memory. As a result, during a later buffer read operation the data and the boundary information can be retrieved and identified.

20 Claims, 3 Drawing Sheets

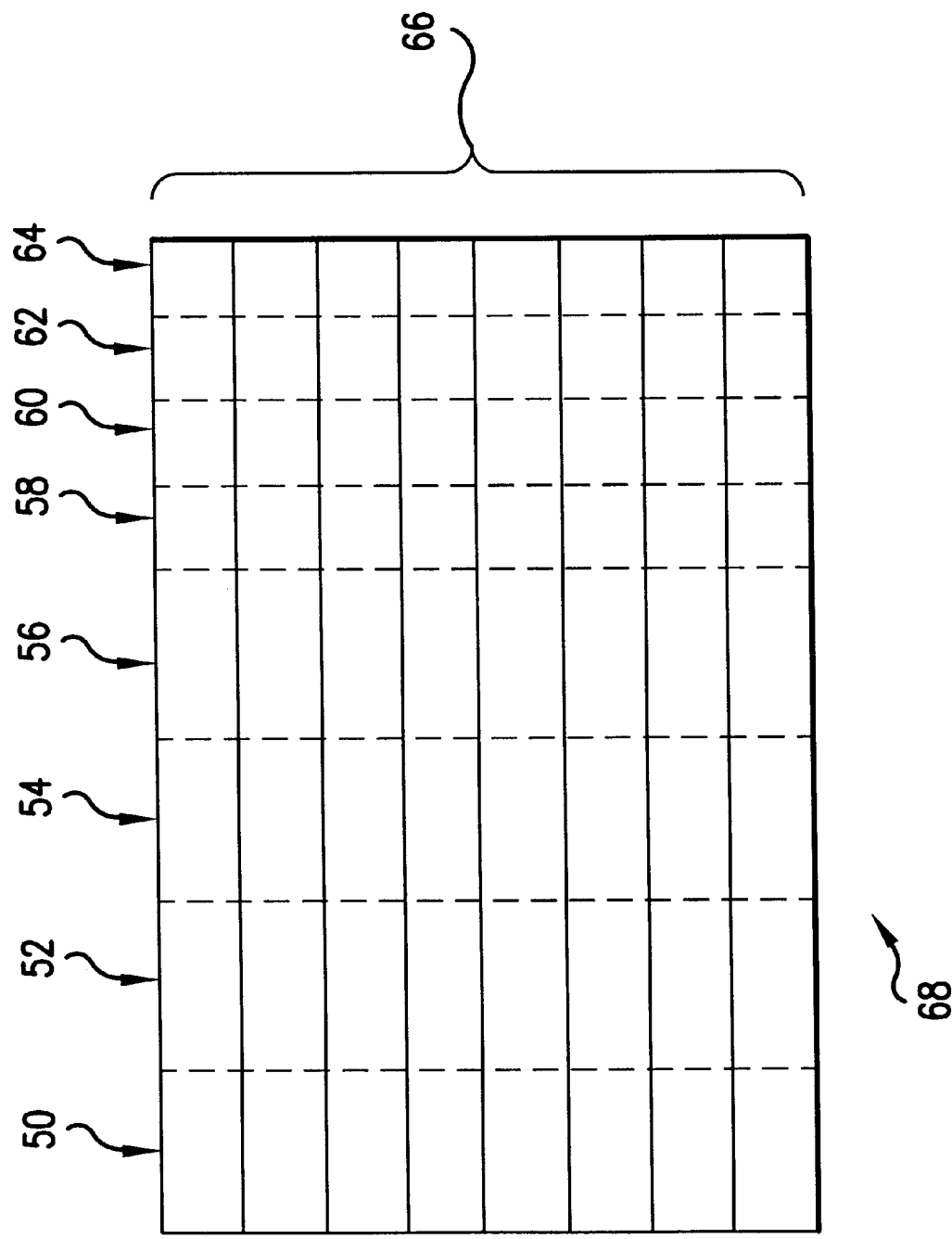

APPARATUS AND METHOD FOR STORING RETRIEVABLE BOUNDARY INFORMATION INTO A BUFFER MEMORY OF A RECEIVING DEVICE

FIELD OF THE INVENTION

The present invention relates to the transfer of data between one device and another device over a communication link, and more particularly to the transfer of data between a host computer and a mass storage device.

BACKGROUND OF THE INVENTION

Host computers often operate with one or more mass storage devices, such as a hard disk drive or magnetic tape drive, over some sort of communication link. In addition, data is often transferred between a host computer and a mass storage device over a communication link on a per-block basis. For purposes of this application, the data contained in a block is referred to herein as "block data".

Today's communication links, such as the Small Computer System Interface (SCSI), support high data transfer rates. In order to make use of these high data transfer rates, both host computers and mass storage devices typically include one or more buffer memory devices (buffer memory). The buffer memory is used to receive and temporarily store incoming block data at the high data transfer rate supported by the particular communication link being used. After the block data is received, it may then be read from the buffer memory and processed. An example of a mass storage device making use of a buffer memory for this purpose can be found in U.S. Pat. No. 4,843,544, entitled Method and Apparatus for Controlling Data Transfers through Multiple Buffers. That patent is incorporated herein by reference.

During the transfer of block data into the buffer memory of a receiving device (i.e., either a host computer or mass storage device), the boundary of where one block ends and another begins must remain known in order to preserve the block data format information. This can be a complicated task as the length of each block can vary and a block boundary can reside anywhere in the buffer memory. Prior art systems for accomplishing this task include a microprocessor and a software routine, or a relatively complex state machine. These prior art systems can result in significant system overhead thereby reducing the performance level of a receiving device, or alternatively require the need for high cost control circuitry to achieve the desired performance level.

SUMMARY OF THE INVENTION

The present invention includes apparatus which can be used by a receiving device for receiving a data packet over a communication link. The apparatus includes a buffer memory and an interface-control unit that is connected to the buffer memory. The interface-control unit is implemented to receive the data packet and respond thereby to: determine a boundary indicator for the data packet; and to write the data packet and the boundary indicator into the buffer memory so as to create a logical link between the data packet and the boundary indicator.

The present invention also includes a method for receiving a data packet and for writing the data packet, along with boundary information for the data packet, into a buffer memory of a receiving device. The method includes the steps of receiving the data packet over the communication link, determining a boundary indicator for the data packet, and writing the data packet and the boundary indicator into the buffer memory so as to create a logical link between the data packet and the boundary indicator. The boundary indicator can be used to indicate whether the data packet is an end of block data packet, or an end of burst data packet or both. This invention can be implemented wherein the communication link is a SCSI communication link. Also, the receiving device can be a mass storage device, such as a tape storage device, or a host computer.

DESCRIPTION OF THE DRAWINGS

FIG. 3 depicts a buffer memory which is organized according to one implementation of a set of organization rules.

DETAILED DESCRIPTION OF THE INVENTION

As previously mentioned, during the transfer of block data into the buffer memory of a receiving device (i.e., either a host computer or mass storage device), the boundary of where one block ends and another begins must remain known in order to preserve the block data format information. This can be a complicated task as the length of each block can vary and a block boundary can reside anywhere in the buffer memory. As compared to the prior art, the present invention significantly simplifies this task.

Figure 1:
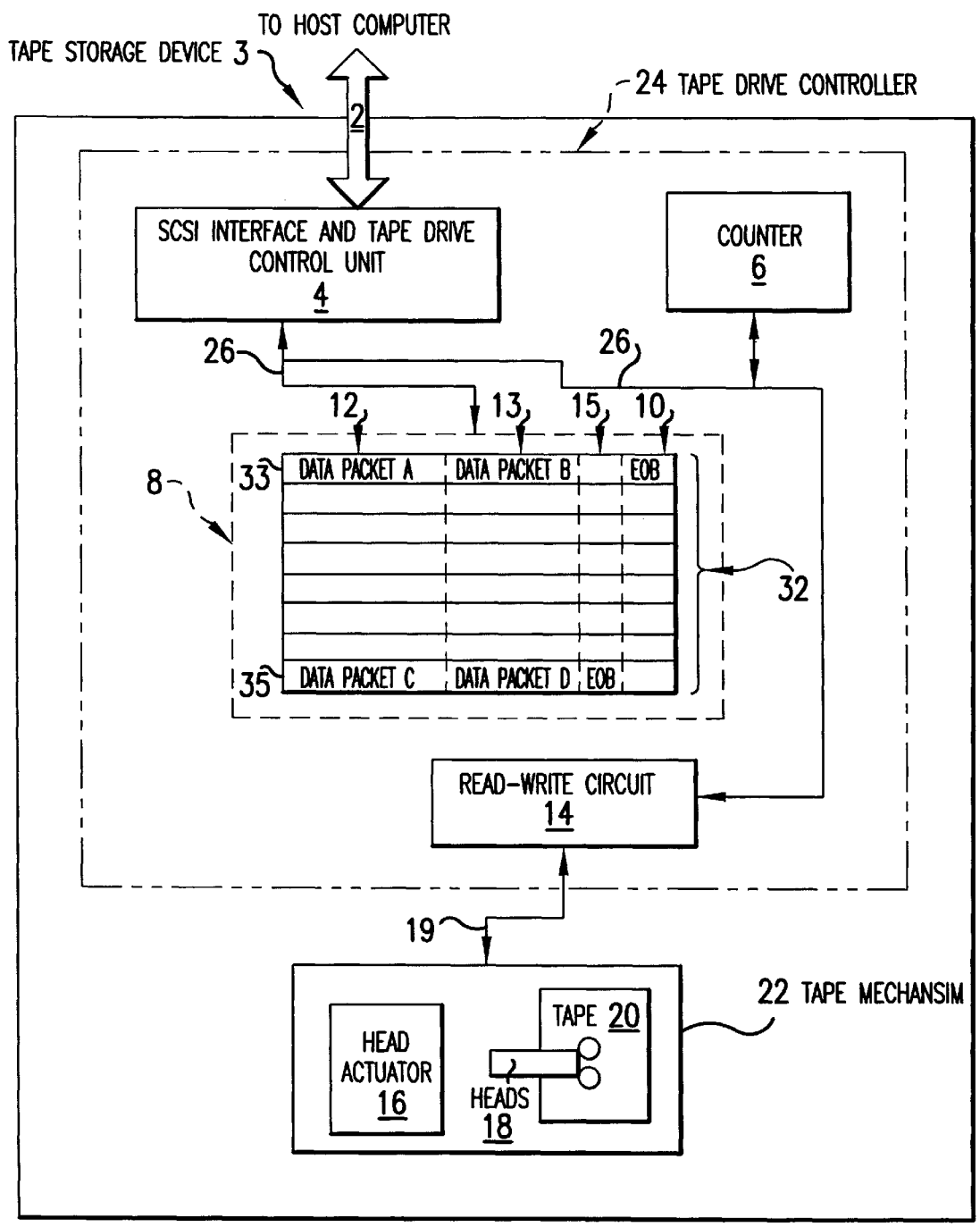
FIG. 1 is a circuit block diagram illustrating an exemplary embodiment of the present invention.

FIG. 1 is a circuit block diagram illustrating a first exemplary embodiment of the present invention. Referring to FIG. 1, a host computer (not shown) is connected to Tape Storage Device 3. Tape Storage Device 3 adheres to a Digital Data Storage (DDS) standard (defined by ISO/IEC Standard 10777:1991 E) and includes a Tape Drive 24 and a Tape Mechanism 22.

The host computer is connected to Tape Drive 24 via SCSI Bus 2 which is a "fast wide" SCSI communication link well known in the art. It is noted that the present invention could also be implemented with other types of communications links (existing today or yet to be developed).

For purposes of this application, a "data packet" is a group of binary bits (bits), that is transferred as a unit over a communication link to a receiving device. The number of bits in a data packet may be defined differently for different implementations of the present invention. This is dependant, in part, upon the type of communication link used. For the present embodiment, a data packet is defined to be 8-bits wide. SCSI Bus 2 includes sixteen parallel data lines and can therefore transfer two data packets (in parallel) at a time during each data transfer.

The host computer and Tape Drive 24 typically transfer data on a per-block basis. Each block is transferred via a series of data transfers over SCSI Bus 2. The last data packet to complete the block transfer is referred to herein as an "end of block (EOB) data packet" or alternatively as "EOB data". It is noted that the SCSI protocol allows for multiple data transfers to occur in bursts. In the present embodiment, the host computer and Tape Drive 24 use this functionality to perform block transfers. The details of transferring data in bursts are well known in the art; therefore this aspect of the operation of Tape Drive 24 and the host computer is not considered in detail.

Tape Drive 24 is represented in FIG. 1 by four functional blocks which are useful for describing the invention: a "SCSI interface and tape drive control unit" (Interface-Control Unit) 4, a Counter 6, a Buffer Memory 8 and a Read-Write Circuit 14, all interconnected via an Internal Bus 26. As explained in additional detail below, Interface-Control unit 4 is both the interface between SCSI Bus 2 and Buffer Memory 8 and controls various aspects of Counter 6 and Read-Write Circuit 14.

Tape Mechanism 22 is connected to Read-Write Circuit 14 via a Second Internal bus 19, and is also represented in FIG. 1 by functional blocks which are as follows: Read-Write Heads (Heads) 18, a Head Actuator 16 for controlling the movement of Heads 18, and Tape 20. Operation of these functional blocks are well known in the linear recording arts and therefore their operation will not be considered in detail.

Tape 20 serves as the mass storage medium for Tape Storage Device 3. As mentioned previously, Tape Storage Device 3 adheres to a DDS standard. According to the DDS standard, block data is stored onto Tape 20 in a representative series of data groups. Also, each data group has an associated index file also stored onto Tape 20. The block structure of the data stored in these data groups is represented by marks in the associated index files. A mark indicating that a particular group contains EOB data is referred to herein as an "EOB mark".

Buffer Memory 8 includes a series of storage registers (Storage Registers) 32 of which only a representative portion is shown in FIG. 1. Each storage register of Storage Registers 32 can receive two data packets and two boundary indicators (one for each data packet). The purpose of the boundary indicator is explained in further detail below.

Interface-Control Unit 4 manages the flow of data into and out of Buffer Memory 8 by using a buffer memory input pointer (input pointer) and a buffer memory output pointer (output pointer). The input pointer is used to identify the appropriate storage register for receiving data during a write operation of data into Buffer Memory 8 (buffer write operation). The output pointer is used to identify the appropriate storage register for reading data during a read operation of data from Buffer Memory 8 (buffer read operation).

With this preliminary description of the functional blocks depicted in FIG. 1, the operation of Tape Storage Device 3 and the host computer to transfer a block will now be described.

In order to set-up a block transfer from the host computer to Tape Storage Device 3, certain parameters (defined by the SCSI protocol) are exchanged between the host computer and Interface-Control Unit 4 over SCSI Bus 2. One of these parameters, which is communicated from the host computer to Interface-Control Unit 4, is the number of data packets that will be transmitted during the block transfer. Interface-Control Unit 4 responds to this parameter by sending a control signal to Counter 6 over Internal Bus 26 to preset Counter 6 accordingly. In this embodiment, Counter 6 is a hardware circuit, however, in other embodiments the counter could be implemented by a software routine.

When both Tape Drive 24 and host computer are ready, the host computer begins transferring the block data over to Tape Storage Device 3 via a series of data transfers over SCSI Bus 2. During a typical data transfer, two data packets (containing a total of two bytes of block data) are transmitted over the sixteen data lines of SCSI Bus 2 and are each received by Interface-Control Unit 4. According to the SCSI protocol, the first data packet in any one data transfer is transmitted by the host computer on the D0–D7 data lines of SCSI Bus 2 and the second data packet is transmitted by the host computer on the D8–D15 data lines.

After each data transfer, Interface-Control Unit 4 checks whether any of the data packets just received is an EOB data packet. In the present embodiment this is accomplished by Interface-Control Unit 4 decreasing Counter 6 by one for each data packet received and then checking if the count value has gone to zero. If so, then the corresponding data packet is determined to be an EOB data packet. It is noted that this is only one way an EOB data packet can be determined. Other techniques (currently known in the art or yet to be developed) could also be used without departing from the present invention.

After the EOB determination is made, a boundary indicator is then also determined for each of the two data packets. After these two boundary indicators have been determined, the two data packets and the boundary indicator for each data packet are written into Buffer Memory 8. This is done such that each data packet and its boundary indicator can be identified upon a later buffer read operation. For purposes of this application, this is referred to herein as creating a "logical link" between a data packet and its boundary indicator. The logical link is created by performing each buffer write operation according to a set of organization rules. In this embodiment, a boundary indicator is one bit wide and is used to indicate end of block status of a logically linked data packet. That is to say, the boundary indicator is used to determine whether its logically linked data packet is an EOB data packet.

As will be understood by someone skilled in the art, there are many sets of organization rules which can be used to create a logical link between a data packet and its boundary indicator. The present invention, in its broadest sense, is not limited to any particular one of these. The set of organization rules used in the present embodiment is illustrated in FIG. 1 and is as follows:

1. first column 12 (eight bits wide) is reserved for data packets received over the D0–D7 data lines;
2. second column 13 (also eight bits wide) is reserved for data packets received over the D8–D15 data lines;
3. third column 15 (one bit wide) is reserved for the boundary indicator that is to be logically linked to the data packet stored in the same storage register and located in first column 12; and
4. fourth column 10 (one bit wide) is reserved for the boundary indicator that is to be logically linked to the data packet stored in the same storage register and located in second column 13.

It is noted that the use of the word "column" is used only to convey the organization rules that are used for this present embodiment. It is not meant to limit the present invention to any particular buffer memory physical orientation or memory architecture.

To further illustrate the organization rules used in the present embodiment, an example is provided. Assume that during a particular data transfer, "data packet A" and "data packet B" were received. Data packet A was received over the D0–D7 data lines and data packet B was received over the D8–D15 data lines. After receiving these data packets, data packet B was determined by Interface-Control Unit 4 to be an EOB data packet. Prior to writing data packet A and data packet B into Buffer Memory 8, the input pointer was pointing to First Storage Register 33. Therefore, data packet A and data packet B are written as shown into First Storage Register 33. Also, because data packet B was determined to be an EOB data packet the bit is set as shown (represented by "EOB" in FIG. 1) in fourth column 10 of First Storage Register 33. This bit is the boundary indicator for data packet B and because it is located in fourth column 10 (see rule number 4 above) it is therefore logically linked to data packet B. As a result, it is understood that data packet B is an EOB data packet.

These same organization rules just described are followed for all subsequent data transfers. As a result, upon a later buffer read operation of data from a storage register; each data packet stored in that storage register, and the boundary indicator for each data packet, can be easily retrieved and properly interpreted. This is further illustrated below.

After (or during) the performance of data transfers, data is read from Buffer Memory 8 by Read-Write Circuit 14 for storage onto Tape 20. Read-Write Circuit 14 performs a buffer read operation in response to a control signal, referred to herein as a "read-control signal". The read-control signal is transmitted from Interface-Control Unit 4 over Internal Bus 26 to Read-Write Circuit 14. The read-control signal informs Read-Write Circuit 14 to perform a buffer read operation. During a buffer read operation, data is read from the storage register identified by the output pointer and is interpreted according to the organization rules just described. For example, assume the output pointer is currently pointing to Second Storage Register 35 and a corresponding read-control signal is generated by Interface-Control Unit 4 and is transmitted to Read-Write Circuit 14. Read-Write Circuit 14 responds thereto by reading the contents of Second Storage Register 35 in the following way: data packet C is the first to be processed data packet from Second Storage Register 35 and because the boundary indicator (read from third column 15) for data packet C is set, data packet C is determined to be an EOB data packet. Further, data packet D (whose boundary indicator, located in fourth column 10, is not set) is interpreted as not being an EOB data packet. Read-Write Circuit 14 responds by reducing this information into signals suitable for storing these data packets appropriately onto Tape 20 according to the DDS standard.

Figure 2:
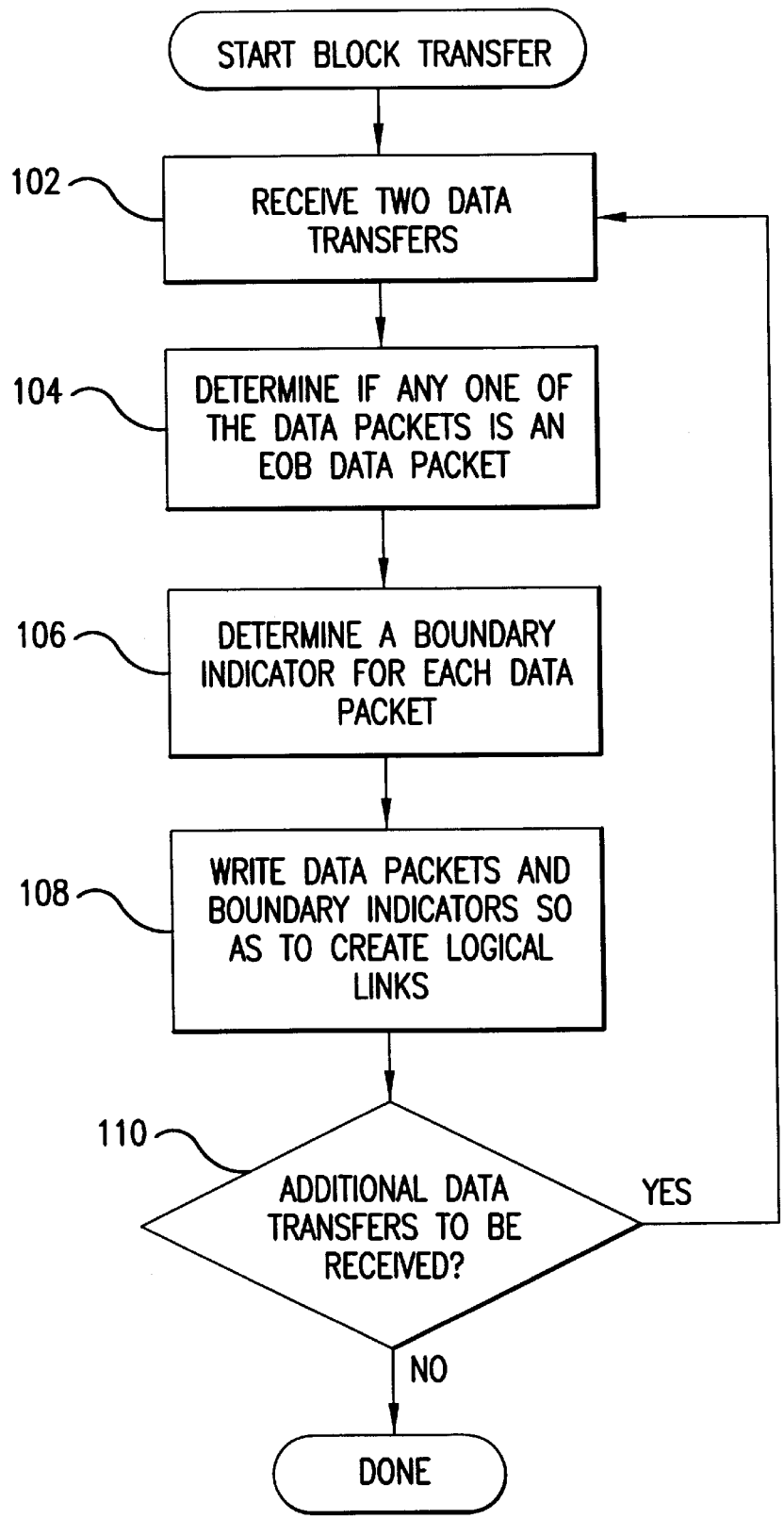
FIG. 2 depicts a logic diagram illustrating an alternative representation of the present invention.

FIG. 2 depicts a logic diagram for illustrating another exemplary embodiment of the present invention. Typically the steps depicted in FIG. 2 are performed by a receiving device in response to data transfers of block data over a communication link from a sending device. The steps depicted in FIG. 2 can be repeated by the receiving device until an entire block of data is transferred. It is noted that the present embodiment could be implemented in a number of ways. For example, the receiving device could be either a host computer or a mass storage device. Likewise, the sending device could also be, for example, either a host computer or a mass storage device.

The receiving device includes an interface-control unit similar to the one depicted in FIG. 1. In this embodiment, however, the interface control unit is adapted to receive two data transfers (instead of one) before writing the data packets into the buffer memory. In addition, each storage register of the buffer memory is sized to receive four data packets and four boundary indicators.

Turning now to FIG. 2, the receiving device begins performing the steps depicted in FIG. 2 at the start of a block transfer from the sending device to the receiving device. The block data is transferred to the receiving device via a series of data transfers over a communication link between the sending device and receiving device. During a typical data transfer, two data packets are transmitted.

The receiving device first receives data packets as a result of two data transfers (step 102). After receiving the data packets, the receiving device then determines if any one of the data packets is an EOB data packet (step 104). After this determination is made, a boundary indicator is then also determined for each data packet (step 106). Each data packet and its boundary indicator is then written into the buffer memory of the receiving device so as to create a logical link (step 108). As previously mentioned, this is accomplished by using a set of organization rules which is followed for each buffer write operation. As a result, during a later buffer read operation each data packet and its boundary indicator can be retrieved and each identified. If there are additional data transfers to be performed (decision step 110) then the steps just described are repeated until the entire block has been transferred.

FIG. 3 is used to illustrate a set of organization rules which can be used for the present embodiment (depicted in FIG. 2). In this case, it is assumed that two data packets are received for each data transfer. FIG. 3 illustrates a Buffer Memory 68 having Storage Registers 66 of which only a representative portion is shown in FIG. 3. Each storage register of Storage Registers 66 can receive four data packets and four boundary indicators. Each time step 108 is performed, the data packets received as a result of performing step 102 and the boundary indicators determined by performing step 106 are all written into a single storage register that is identified by an input pointer. In addition, each time step 108 is performed the following organization rules are followed:

1. a data packet stored in first column 50 is logically linked to a boundary indicator stored in fifth column 58 of the same storage register;
2. a data packet stored in second column 52 is logically linked to a boundary indicator stored in sixth column 60 of the same storage register;
3. a data packet stored in third column 54 is logically linked to a boundary indicator stored in seventh column 62 of the same storage register; and
4. a data packet stored in fourth column 56 is logically linked to a boundary indicator stored in eighth column 64 of the same storage register.

As previously indicated, following these organization rules for each buffer write operation results in the ability to later perform buffer read operations wherein each data packet and its indicator can be retrieved and identified.

It can now be seen from the exemplary embodiments described above, that the present invention provides an improved system for preserving block data format information as block data is written into and read from a buffer memory of a receiving device. This has been accomplished without the system overhead or high cost circuitry associated with prior art systems for accomplishing the same task. As a result, this invention can result in receiving devices having improved data handling performance, lower cost or both. In addition, the present invention can be implemented in a receiving device without requiring modifications to existing sending devices.

It is also noted that the boundary indicator can also include additional information pertaining to a logically linked data packet. For example, the boundary indicator could also be used to indicate whether a logically linked data packet is a beginning or end of a particular burst. For purposes of this application, this type of boundary indicator is referred to herein as indicating burst boundary status of a logically linked data packet. This can be useful if a particular burst must be retried as a result of, for example, a parity error. The burst may be subsequently re-sent and placed in the correct buffer memory location according to the boundary indicator information. Again, this is all accomplished without the system overhead associated with prior art systems. This is the case because the task of keeping track of where the beginning and end of a burst are located within a buffer memory can now be retrieved (by reading boundary indicators) from the buffer memory itself.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. In a receiving device, apparatus for receiving a data packet over a communication link, comprising:
   (a) a buffer memory comprising a logically linked first and second storage area;
   (b) an interface-control unit, connected to said buffer memory, operable to write a single data packet into the first storage area and a boundary indicator into the second storage area, the boundary indicator indicating only boundary information for only the single data packet.

2. Apparatus as recited in claim 1, wherein said boundary indicator indicates end of block status of said data packet.

3. Apparatus as recited in claim 2, wherein said boundary indicator further indicates burst boundary status of said data packet.

4. Apparatus as recited in claim 1, wherein said boundary indicator indicates burst boundary status of said data packet.

5. Apparatus as recited in claim 2, wherein said boundary indicator is a single bit wide.

6. Apparatus as recited in claim 5, wherein said receiving device further comprises a mass storage device.

7. Apparatus as recited in claim 5, wherein said receiving device further comprises a tape storage device.

8. Apparatus, comprising:
   (a) a buffer memory including a first storage area and a second storage area logically linked to the first storage area, the first storage area for storing only a single data packet at a time and the second storage area for storing a single boundary indicator indicating boundary information for only the single data packet;
   (b) means for receiving a data packet over a communication link;
   (c) means for determining a boundary indicator for said data packet; and
   (d) means for writing said data packet into the first storage area and the boundary indicator into the second storage area.

9. Apparatus as recited in claim 8, wherein said boundary indicator indicates end of block status of said data packet.

10. Apparatus as recited in claim 9, wherein said boundary indicator further indicates burst boundary status of said data packet.

11. Apparatus as recited in claim 8, wherein said boundary indicator indicates burst boundary status of said data packet and consists of a single bit.

12. Apparatus as recited in claim 9, wherein said communication link further comprises a SCSI bus.

13. Apparatus as recited in claim 12, wherein said receiving device further comprises a host computer.

14. Apparatus as recited in claim 12, wherein said receiving device further comprises a mass storage device.

15. A method for receiving a data packet and for writing said data packet, along with boundary information for said data packet, into a buffer memory of a receiving device, comprising:
   (a) reserving a first storage area for storing only a single data packet at a time;
   (b) reserving a second storage area for only storing only a boundary indicator for the single data packet;
   (c) writing a data packet into the first storage area and a boundary indicator for the data packet into the second storage area.

16. The method of claim 15, wherein said boundary indicator indicates end of block status of said data packet.

17. The method of claim 16, wherein said boundary indicator further indicates burst boundary status of said data packet.

18. The method of claim 15, wherein said second storage area is only a single bit wide.

19. The method of claim 15, wherein said boundary indicator indicates only an end of block status for the data packet.

20. The method of claim 15, wherein the boundary indicator is only a single bit wide.

* * * * *